Patent Office 3,281,845
Patented Oct. 25, 1966

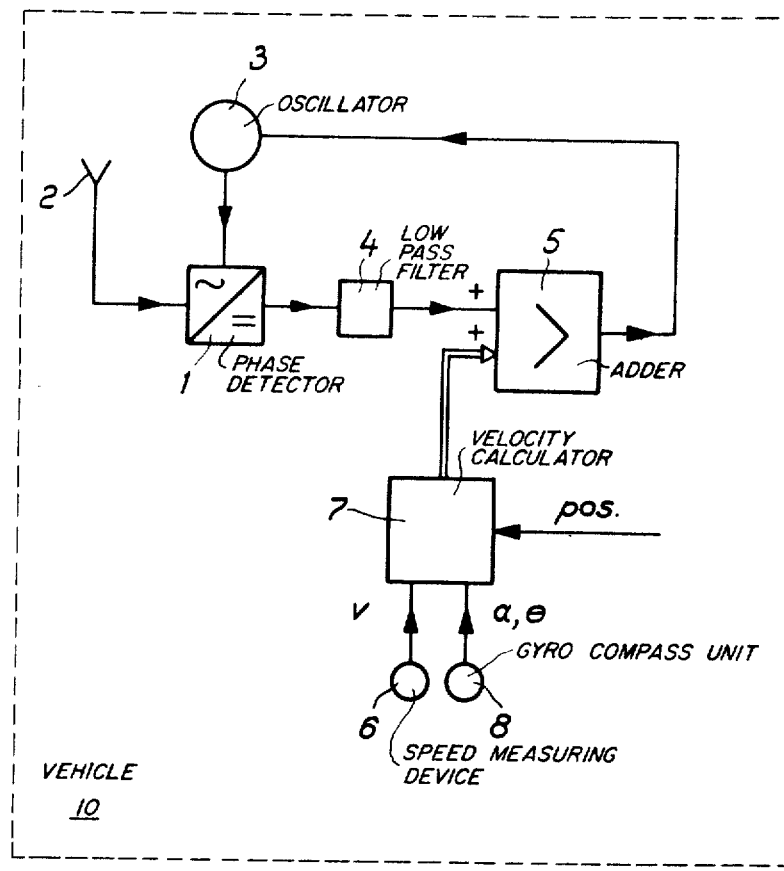

3,281,845
RADIO NAVIGATION EQUIPMENT
Bengt Harry Björkman, Sollentuna, Sweden, assignor to North American Philips Company, Inc., New York, N.Y., a corporation of Delaware
Filed Mar. 10, 1964, Ser. No. 350,873
Claims priority, application Sweden, Mar. 15, 1963, 2,841/63
2 Claims. (Cl. 343—112)

The present invention relates to a radio navigation equipment of the type in which the phase of a radio carrier in relation to a comparison wave is used for indicating the distance to at least one radio transmitter. The equipment comprises a receiver with an oscillator adapted to be frequency controlled in a closed loop regulation circuit. The loop circuit comprises a phase detector which compares the phase of the received radio carrier with the phase of the oscillator voltage. The output voltage of the phase detector is continuously regulated to zero in the closed loop regulation circuit in order to phase lock the oscillator voltage to the radio carrier. In order to suppress disturbances and make the circuit selective a low pass filter having as small band width as possible is provided at the output of the phase detector in such a receiver circuit. A small band width, however, results in a slow regulation response and a decrease of the band width therefore brings about an increase of the error voltage appearing at the output of the phase detector under transient conditions, i.e. at speed changes. The smallest possible band width is determined by the maximum allowable error voltage at the output of the phase detector for normal acceleration values.

It is an object of the invention to provide means for appreciably decreasing the band width of the receiver as compared with the minimum band width in hitherto known systems.

According to the invention the equipment also comprises a speed measuring device actuated independently of the said carrier for measuring the speed of the vehicle in which the receiver is situated, and a device for introducing an additional control voltage in the regulation circuit. The control voltage is derived from the speed measuring device and corresponds to the component of the measured velocity in direction to the radio station. The closed loop regulation circuit also comprises an extremely narrow band filter between the output of the phase detector and the said device for introducing an additional control voltage. This filter substantially passes an information quantity only corresponding to the maximum error in the speed indication of the speed measuring device.

By combining the radio navigation system with a speed measuring device having an immediate response upon velocity changes and delivering the main portion of the information quantity required for regulating the receiver oscillator, the radio navigation system only has to handle an information quantity corresponding to the error in the velocity indication of the said speed measuring device. The band width of the receiver can therefore be greatly decreased. If the percentage error in the speed indication of the speed measuring device is $k\%$ the minimum band width will be only $k\%$ of the band width required without coarse information from the speed measuring device. This latter band width in common systems for example may have a value approximately equal to the maximum Doppler shift.

The principles of the invention can be applied in radio navigation systems in which measured distances are used for the position determination ($\int-\int$-systems) as well as in systems in which distance differences are used (hyperbolic systems).

The invention will now be explained more fully with reference to the accompanying drawing which shows a device according to the invention adapted to be included in a radio receiver for a radio navigation system operating with phase comparison between unmodulated long wave high frequency signals. The radio receiver is assumed to be located in an aeroplane or the like indicated by the dashed box 10 in the figure, and cooperates with a ground transmitter (not shown) to determine the position of the aeroplane.

In the drawing the reference numeral 1 designates a phase detector for comparing a radio carrier received through an aerial 2 with the output voltage from an oscillator 3. The phase detector delivers, in a known manner a D.C.-voltage at its output representing the deviation in phase from a predetermined phase relationship between the compared voltages. This D.C.-voltage is applied by way of a low pass filter 4 to one of the inputs of an adding amplifier or adder 5.

A speed measuring device 6 is situated in the aeroplane. This device continuously measures the velocity $v$ of the aeroplane relative to the surrounding air and delivers a signal representing the said velocity to a device 7. Information from a gyro compass unit 8 regarding the pitch angle $\alpha$ and course angle $\theta$ of the aeroplane and information from the output of the complete radio navigation equipment regarding the position of the aeroplane is also applied to the device 7. The device 7 calculates, first by means of the pitch angle $\alpha$ the horizontal component of the measured velocity and thereafter by means of the course angle $\theta$ and the position, the velocity component of the said horizontal component which is parallel to the connection line between the aeroplane and the radio station. If the measured velocity is represented by an A.C.-voltage the dividing in components can for example be effectuated by means of conventional resolvers, the rotors of which are set in accordance with the actual angles. The output signal from the device 7 representing the said velocity component in direction to the radio station is applied to the second input of the adder 5. The output voltage of the adder is fed to a control electrode of the oscillator 3 for changing the oscillator frequency in dependence upon the output voltage of the adder. In this closed loop regulation circuit, to which is applied coarse information from the speed measuring device 6, the oscillator is controlled such that the output voltage from the phase detector is maintained approximately equal to zero. When the frequency of the incoming carrier changes a small value due to the Doppler effect in response to variations in the velocity of the aeroplane relative to the station, the frequency of the oscillator thus varies the same magnitude so that the oscillator voltage is kept locked with respect to phase to the incoming carrier. The main portion of the control information required for achieving this phase locking is received from the speed measuring device 6 with the converter unit 7, while the output signal from the phase detector only corresponds to a small portion of the total control information, namely the error in the output information from the speed measuring device. The open regulation circuit comprising the speed measuring device has a relatively small time constant. The speed measuring device therefore produces practically immediate regulation of the oscillator frequency upon speed changes to a value near the correct frequency, while the error voltage produced at the output of the phase detector thereafter makes a very slow subsequent adjustment of the oscillator frequency. Due to the fact that only a small portion of the control information has to be transmitted through the closed loop regulation circuit the low pass filter 4 arranged at the output of the phase detector can be made with an extremely small band width.

An integrator is preferably provided in the circuit between the phase detector and the adding amplifier, so that the required control signal to the oscillator 3 can be maintained with the error voltage 0 from the phase detector under stationary conditions, i.e. at constant speed of the aeroplane.

The position determination can be effectuated by comparing the phase of the output voltage of the oscillator 3 with the phase of the output voltage from an oscillator which is phase locked in a similar way to another radio carrier (hyperbolic system) or with the phase of the output voltage of a reference oscillator (∫–∫-system). Alternatively it is possible to use the output voltage from the adder 5 for calculating the distance to the actual radio station.

Instead of dividing the horizontal component of the velocity measured by the speed measuring device in a component in direction to the station and a component perpendicular thereto, as in the described example, it is also possible to divide the horizontal component into a velocity component in latitude or *x*-direction and a component in longitude or *y*-direction. The *x*- and *y*-velocity components then are fed to separate adders. The output voltage from the phase detector representing the distance error in direction to the station is then in a similar way divided by means of information about the own position in components in *x*- and *y*-direction, which components then are fed to respective adder, whereafter the output voltages of the adders are finally combined to a velocity component in direction to the radio station. This circuit will operate in the same way as the described circuit. Converter units for producing the said dividing in components and combination of components, respectively, are well known per se.

The speed measuring device may be included in a coarse navigation equipment normally situated in the aeroplane and having its own output representation device, so that some indication about the position is received if the radio transmission should fail for some reason.

What is claimed is:

1. A radio navigation system of the type in which a receiver positioned on a vehicle includes means for comparing radio carrier waves received from at least one transmitter with a comparison wave in order to determine the distance between the receiver and said transmitter, and in which said receiver comprises a loop circuit of a frequency controllable oscillator, phase detector means for comparing the phase of the oscillations of said oscillator with said received waves to produce an output voltage, and means for applying said output voltage to said oscillator for controlling the frequency thereof, whereby the frequency of said oscillator is continuously controlled to reduce said output voltage in order to lock the phase of said oscillations with said received wave, said system further comprising means for measuring the speed of said vehicle independently of said radio carrier waves, means connected to said speed measuring means for producing a control voltage corresponding to the component of velocity of said vehicle in the direction of said transmitter, means for combining said control voltage with said output voltage in said loop circuit, and narrow band pass filter means in said loop circuit between said phase detector means and combining means, said filter means having a bandwidth sufficient to pass substantially only an information quantity corresponding to the maximum error of said speed meausring means.

2. A radio navigation system for determining the distance between a vehicle and a transmitter, comprising a receiver positioned on said vehicle, said receiver comprising means for receiving radio carier waves from said transmitter, a frequency controllable oscillator, phase detector means for comparing the phase of the oscillations of said oscillator with said received waves to produce an output voltage, means for measuring the speed of said vehicle independently of said radio carrier waves, means connected to said speed measuring means for producing a control voltage corresponding to the component of velocity of said vehicle in the direction of said transmitter, narrow bandpass filter means connected to the output of said phase detector means for limiting the bandwidth of said output voltage, said filter means having a bandwidth sufficient to pass substantially only an information quantity corresponding to the maximum error of said speed measuring means, means for combining the output of said filter means and said control voltage and means applying the output of said combining means to said oscillator for controlling the frequency thereof, whereby the frequency of said oscillator is continuously controlled to reduce said output voltage in order to lock the phase of said oscillations with said received wave.

References Cited by the Examiner

UNITED STATES PATENTS

| 3,204,241 | 8/1965 | Bjorkman | 343—112 |
| 3,217,327 | 11/1965 | Grubb | 343—113 |

CHESTER L. JUSTUS, *Primary Examiner.*

R. E. BERGER, *Assistant Examiner.*